US012780982B2

(12) United States Patent
Lim

(10) Patent No.: US 12,780,982 B2
(45) Date of Patent: Nov. 3, 2026

(54) COPOLYESTER RESIN FOR BINDER FIBER, METHOD FOR PREPARING SAME, AND BINDER FIBER COMPRISING SAME

(71) Applicant: TORAY ADVANCED MATERIALS KOREA INC., Gumi-si (KR)

(72) Inventor: Seong Su Lim, Gumi-si (KR)

(73) Assignee: TORAY ADVANCED MATERIALS KOREA INC., Gumi-si (KR)

( * ) Notice: Subject to any disclaimer, the term of this patent is extended or adjusted under 35 U.S.C. 154(b) by 664 days.

(21) Appl. No.: 18/005,953

(22) PCT Filed: Jul. 20, 2021

(86) PCT No.: PCT/KR2021/009363

§ 371 (c)(1),
(2) Date: Jan. 18, 2023

(87) PCT Pub. No.: WO2022/019625

PCT Pub. Date: Jan. 27, 2022

(65) Prior Publication Data

US 2023/0279178 A1 Sep. 7, 2023

(30) Foreign Application Priority Data

Jul. 20, 2020 (KR) ........................ 10-2020-0089691

(51) Int. Cl.

*C08G 63/183* (2006.01)
*C08G 63/85* (2006.01)
*C08L 67/02* (2006.01)

(52) U.S. Cl.

CPC ........... *C08G 63/183* (2013.01); *C08G 63/85* (2013.01); *C08L 67/02* (2013.01); *C08L 2203/12* (2013.01)

(58) Field of Classification Search

CPC .... C08G 63/183; C08G 63/85; C08G 63/181; C08L 67/02; C08L 2203/12; D01F 6/84
See application file for complete search history.

(56) References Cited

U.S. PATENT DOCUMENTS

| | | | | |
|---|---|---|---|---|
| 3,644,291 A * | 2/1972 | Price | C08G 63/85 528/308 |
| 2002/0193555 A1* | 12/2002 | Hori | C08G 63/82 502/171 |
| 2016/0108068 A1* | 4/2016 | Schoennagel | C08G 63/85 502/170 |
| 2020/0095382 A1* | 3/2020 | Tsai | C08J 3/005 |

FOREIGN PATENT DOCUMENTS

| | | | | |
|---|---|---|---|---|
| JP | 2006-188667 A | | 7/2006 | |
| JP | 2007-217832 A | | 8/2007 | |
| JP | 2013-064156 A | | 4/2013 | |
| KR | 20030037737 A | * | 5/2003 | D01F 6/84 |
| KR | 10-2004-0061346 A | | 7/2004 | |
| KR | 20040096190 A | * | 11/2004 | |
| KR | 10-2005-0014713 A | | 2/2005 | |
| KR | 10-2007-0050980 A | | 5/2007 | |
| KR | 20160024184 A | * | 3/2016 | D01F 6/62 |
| KR | 10-2016-0079347 A | | 7/2016 | |
| KR | 10-2019-0061561 A | | 6/2019 | |
| KR | 10-2061805 B1 | | 1/2020 | |
| KR | 10-2020-0027274 A | | 3/2020 | |
| WO | WO 99/24648 A1 | | 5/1999 | |
| WO | WO-2012116481 A1 | * | 9/2012 | D01F 6/84 |
| WO | WO 2020/004732 A1 | | 1/2020 | |
| WO | WO 2021/071251 A1 | | 4/2021 | |
| WO | WO 2020/067154 A1 | | 9/2021 | |

OTHER PUBLICATIONS

English Machine translation of KR 20030037737.*
English Machine Translation of KR 2016/0079347.*
English Machine Translation of KR 2019/0061561.*
English Machine Translation of WO 2012/116481.*
English Machine Translation of KR 2004/0096190.*
International Search Report mailed Nov. 22, 2021 in International Application No. PCT/KR2021/009363.
European Office Action received in European Application No. 21846173.9, dated Aug. 6, 2024.

* cited by examiner

*Primary Examiner* — Jennifer A Gillett

(74) *Attorney, Agent, or Firm* — Knobbe, Martens, Olson & Bear, LLP

(57) ABSTRACT

The present invention relates to a copolyester resin for a binder fiber, and more specifically to a copolyester resin for a binder fiber in which as polymerization is possible with excellent reactivity even at low temperatures, thermal decomposition is prevented, processability is excellent, and the amount of acetaldehyde generated during the process is remarkably low, and at the same time, it is eco-friendly and has excellent heat resistance, high temperature stability and adhesive strength, and it exhibits the effect of expressing a desired color tone, a method for preparing the same and a binder fiber including the same.

8 Claims, No Drawings

COPOLYESTER RESIN FOR BINDER FIBER, METHOD FOR PREPARING SAME, AND BINDER FIBER COMPRISING SAME

CROSS-REFERENCE TO RELATED APPLICATION

This application claims priority to and the benefit of Korean Patent Application No. 10-2020-0089691, filed on Jul. 20, 2020, the disclosure of which is incorporated herein by reference in its entirety.

TECHNICAL FIELD

The present invention relates to a copolyester resin for a binder fiber, and more specifically to a copolyester resin for a binder fiber in which as polymerization is possible with excellent reactivity even at low temperatures, thermal decomposition is prevented, processability is excellent, and the amount of acetaldehyde generated during the process is remarkably low, and at the same time, it is eco-friendly and has excellent heat resistance, high temperature stability and adhesive strength, and it exhibits the effect of expressing a desired color tone, a method for preparing the same and a binder fiber including the same.

BACKGROUND ART

Polyester is a commercially very important polymeric material that is not only the most widely used synthetic fiber material today, but also a material for various plastic products because of its excellent mechanical properties, chemical stability and high melting point. In order expand the application range of PET, many studies are being conducted, and particularly, attempts to improve various properties and improve productivity by synthesizing PET having a high degree of polymerization and a low carboxyl group content in a shorter period of time are steadily being studied.

Meanwhile, the polyester resin undergoes, for example, an esterification reaction and a melt polycondensation reaction. Catalysts are generally used for the polycondensation reaction, and antimony compounds are mostly used on an industrial scale.

Meanwhile, the International Agency for Research on Cancer (IARC) of the World Health Organization (WHO) classifies antimony as a substance that is carcinogenic to humans, and environmental regulations restricting the use of antimony are accelerating currently in Europe, and particularly, eco-friendly demand for sanitary products that come into direct contact with the human body is rapidly increasing. However, a polyester resin prepared with an antimony compound as a catalyst has a unique black color, and it has problems in terms of safety and hygiene and environmental considerations based on the toxicity pointed out in antimony compounds.

For this reason, numerous compounds have been conventionally proposed as catalysts to replace antimony compounds, and among these, various types of titanium compounds have been proposed because they are inexpensive and have no safety and health problems. However, the polyester resin prepared using a conventional titanium compound as a catalyst has a characteristic yellow color and poor thermal stability, and thus, there has been a disadvantage in that a large amount of acetaldehyde derived from decomposition reaction is generated during polycondensation and melt molding.

That is, as the polyester resin prepared using a conventional titanium compound as a catalyst can be polymerized with excellent reactivity even at low temperatures, it has had problems in that it is not possible to simultaneously exhibit the effects that thermal decomposition is prevented and processability is excellent, the amount of acetaldehyde generated during the process is remarkably low, and it has remarkably low contents of impurities and acetaldehyde in resin, and at the same time, it is eco-friendly and has excellent heat resistance, high temperature stability and adhesive strength, and it is possible to express a desired color tone.

Accordingly the situation that the development of a polyester resin and a method for preparing the same is urgently needed, in which as polymerization is possible with excellent reactivity even at low temperatures, thermal decomposition is prevented, processability is excellent, and the amount of acetaldehyde generated during the process is remarkably low, and at the same time, it is eco-friendly and has excellent heat resistance, high temperature stability and adhesive strength, and it exhibits the effect of expressing a desired color tone.

DISCLOSURE

Technical Tasks

The present invention has been devised to solve the above-described problems, and an object of the present invention is to provide a copolyester resin for a binder fiber in which as polymerization is possible with excellent reactivity even at low temperatures, thermal decomposition is prevented, processability is excellent, and the amount of acetaldehyde generated during the process is remarkably low, and at the same time, it is eco-friendly and has excellent heat resistance, high temperature stability and adhesive strength, and it exhibits the effect of expressing a desired color tone, a method for preparing the same and a binder fiber including the same.

Technical Solution

In order to solve the above-described problems, the present invention provides a copolyester resin for a binder fiber, wherein the copolyester resin is formed by polycondensing an ester reactant, which is formed through an acid component including at least one of terephthalic acid and isophthalic acid and a diol component including a compound represented by Chemical Formula 1 below and ethylene glycol, under a polycondensation catalyst including a titanium-based chelate compound:

[Chemical Formula 1]

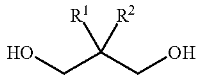

wherein in Chemical Formula 1 above, $R^1$ is a $C_1$-$C_4$ straight-chain alkyl group or a $C_3$-$C_4$ branched alkyl group, and $R^2$ is a hydrogen atom, a $C_1$-$C_4$ straight-chain alkyl group or a $C_3$-$C_4$ branched alkyl group.

According to an embodiment of the present invention, the titanium-based chelate compound may include a compound represented by Chemical Formula 2 below:

[Chemical Formula 2]

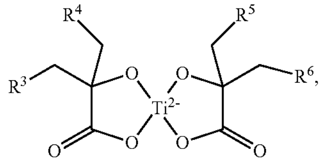

wherein in Chemical Formula 2 above, $R^3$ to $R^6$ are each independently a hydrogen atom, —COOH, —OH, —CHO, —CO, —O, —COO or —$NH_2$.

In addition, the copolyester resin for a binder fiber may include diethylene glycol at 5 wt. % or less.

In addition, the copolyester resin for a binder fiber may have 45 or less —COOH groups in the molecular structure and include 3 to 50 ppm of Ti element.

In addition, the melting point or softening point may be 100 to 180° C., and the glass transition temperature may be 55 to 80° C.

In addition, the ester reactant may be formed by reacting the acid component and the diol component at a molar ratio of 1:0.8 to 1:6.

In addition, the acid component may include 65 to 100 mol % of terephthalic acid and 0 to 35 mol % of isophthalic acid, and wherein the diol component may include 25 to 50 mol % of the compound represented by Chemical Formula 1 above and 50 to 75 mol % of ethylene glycol.

In addition, the compound represented by Chemical Formula 1 above may include a compound represented by Chemical Formula 3 below and a compound represented by Chemical Formula 4 below at a molar ratio of 1:0.02 to 1:

[Chemical Formula 3]

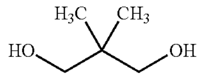

[Chemical Formula 4]

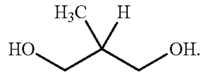

In addition, the present invention provides a method for preparing a copolyester resin for a binder fiber, including the steps of (1) forming an ester reactant by reacting an acid component including at least one of terephthalic acid and isophthalic acid and a diol component including a compound represented by Chemical Formula 1 below and ethylene glycol; and (2) preparing a copolyester resin for a binder fiber by poly condensation by adding a poly condensation catalyst including a titanium-based chelate compound to the ester reactant:

[Chemical Formula 1]

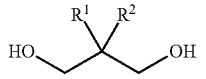

wherein in Chemical Formula 1 above, $R^1$ is a $C_1$-$C_4$ straight-chain alkyl group or a $C_3$-$C_4$ branched alkyl group, and $R^2$ is a hydrogen atom, a $C_1$-$C_4$ straight-chain alkyl group or a $C_3$-$C_4$ branched alkyl group.

According to an embodiment of the present invention, in step (2), the polycondensation catalyst including the titanium-based chelate compound may be added at 230 to 380 ppm, and wherein the copolyester resin for a binder fiber may include Ti element at 3 to 50 ppm.

Further, in step (2), the polycondensation may be carried out at a temperature of 285° C. or less.

In addition, the amount of acetaldehyde generated by performing polycondensation in step (2) may be less than 1,650 ppb.

In addition, the present invention provides a binder fiber, including the above-described copolyester resin for a binder fiber.

In addition, the present invention provides an automobile interior material, including the binder fiber.

In addition, the present invention provides a sanitary material, including the binder fiber.

Advantageous Effects

As polymerization is possible with excellent reactivity even at low temperatures, the copolyester resin for a binder fiber, method for preparing the same and binder fiber including the same according to the present invention can prevent thermal decomposition, processability is excellent, and the amount of acetaldehyde generated during the process is remarkably low, and at the same time, it is eco-friendly and has excellent heat resistance, high temperature stability and adhesive strength, and it has the effect of expressing a desired color tone.

EMBODIMENTS

Hereinafter, embodiments of the present invention will be described in detail so that those of ordinary skill in the art to which the present invention pertains can easily practice the present invention. The present invention may be embodied in many different forms and is not limited to the embodiments set forth herein.

The copolyester resin for a binder fiber according to an embodiment of the present invention is formed by polycondensing an ester reactant, which is formed through an acid component including at least one of terephthalic acid and isophthalic acid and a diol component including a compound represented by Chemical Formula 1 below and ethylene glycol, under a polycondensation catalyst including a titanium-based chelate compound:

[Chemical Formula 1]

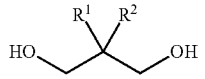

wherein in Chemical Formula 1 above, $R^1$ is a $C_1$-$C_4$ straight-chain alkyl group or a $C_3$-$C_4$ branched alkyl group, and $R^2$ is a hydrogen atom, a $C_1$-$C_4$ straight-chain alkyl group or a $C_3$-$C_4$ branched alkyl group.

In this case, as described above, the acid component may include at least one of terephthalic acid and isophthalic acid, and preferably, the acid component may include terephthalic acid and optionally include isophthalic acid for excellent thermal bonding properties at low temperatures.

Specifically, the acid component may include 65 to 100 mol % of terephthalic acid and 0 to 35 mol % of isophthalic acid, and preferably, 70 to 100 mol % of terephthalic acid and 1 to 30 mol % of isophthalic acid. If the amount of isophthalic acid is more than 35 mol %, fibers and articles to be implemented may become excessively hard, and heat resistance may deteriorate due to an excessively low glass transition temperature.

Meanwhile, as described above, in Chemical Formula 1 above, $R^1$ may be a $C_1$-$C_4$ straight-chain alkyl group or a $C_3$-$C_4$ branched alkyl group, and preferably, a $C_1$-$C_3$ straight-chain alkyl group, and $R^2$ may be a hydrogen atom, a $C_1$-$C_4$ straight-chain alkyl group or a $C_3$-$C_4$ branched alkyl group, and preferably, a hydrogen atom or a $C_1$-$C_3$ straight-chain alkyl group.

In addition, the compound represented by Chemical Formula 1 may include a compound represented by Chemical Formula 3 and a compound represented by Chemical Formula 4 below:

[Chemical Formula 3]

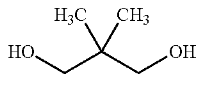

[Chemical Formula 4]

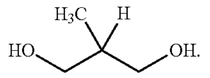

In this case, the compound represented by Chemical Formula 1 may include the compound represented by Chemical Formula 3 in a greater mol % than the compound represented by Chemical Formula 4, and preferably, it may include the compound represented by Chemical Formula 3 and the compound represented by Chemical Formula 4 at a molar ratio of 1:0.02 to 1, and more preferably, at a molar ratio of 1:0.025 to 0.9.

If the molar ratio of the compound represented by Chemical Formula 3 and the compound represented by Chemical Formula 4 is less than 1:0.02, problems with the change over time such as poor heat resistance and poor storage stability may occur, and if the molar ratio is more than 1:1, low-temperature thermal bonding properties may be significantly lowered, and processability may be significantly lowered due to excessive shrinkage characteristics.

In addition, as described above, the diol component may include 25 to 50 mol % of the compound represented by Chemical Formula 1 and 50 to 75 mol % of ethylene glycol, and preferably, 30 to 45 mol % of the compound represented by Chemical Formula 1 and 55 to 70 mol % of ethylene glycol. If the compound represented by Chemical Formula 1 above is included at less than 25 mol % or the ethylene glycol is included at more than 75 mol %, as the crystallinity of the copolyester resin increases, it is not easy to implement a low melting point or softening point, and thus, low-temperature thermal bonding properties may be significantly lowered, and if the compound represented by Chemical Formula 1 is included at more than 50 mol % or ethylene glycol is included at less than 50 mol %, the reactivity may be reduced, and the spinnability may be lowered during fiber formation, and high thermal bonding properties at a desired temperature may not be expressed.

Meanwhile, the ester reactant may be formed by reacting the acid component and the diol component at a molar ratio of 1:0.8 to 1:6, and preferably, it may be formed by reacting the acid component and the diol component at a molar ratio of 1:1 to 1:5. If the molar ratio of the acid component and the diol component is less than 1:0.8, problems may occur where a side reaction is promoted as the acidity increases, and if the molar ratio is more than 1:6, problems may occur where the copolyester resin cannot exhibit the desired degree of polymerization.

The titanium-based chelate compound may be a known titanium-based chelate compound, and preferably, it may include a compound represented by Chemical Formula 2 below:

[Chemical Formula 2]

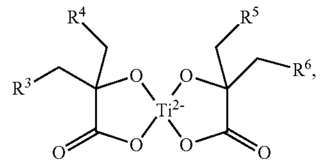

wherein in Chemical Formula 2, $R^3$ to $R^6$ may each independently be a hydrogen atom, —COOH, —OH, —CHO, —CO, —O, —COO, or —$NH_2$, and preferably, a hydrogen atom or —COOH, and more preferably, —COOH.

As the ester reactant is polycondensed under a polycondensation catalyst including a titanium-based chelate compound, polymerization is possible with excellent reactivity even at low temperatures, and accordingly, thermal decomposition is prevented, processability is excellent, and the amount of acetaldehyde generated during the process is remarkably low, and at the same time, it is eco-friendly and has excellent heat resistance, high temperature stability and adhesive strength, and it exhibits the effect of expressing a desired color tone.

Meanwhile, the copolyester resin for a binder fiber according to the present invention may further include a heat stabilizer.

As the heat stabilizer, any heat stabilizer commonly used in the art may be used without limitation, and preferably, a phosphorus-based heat stabilizer may be used.

In addition, the thermal stabilizer may be included at 5 to 35 ppm, and preferably, 10 to 30 ppm, based on the amount of phosphorus (P) element in the thermal stabilizer, but the present invention is not limited thereto.

Meanwhile, the copolyester resin for a binder fiber according to the present invention may include diethylene glycol at 5 wt. % or less, and preferably, 3 wt. % or less. Although the diethylene glycol is not separately added during the preparation of the composition, it is naturally generated during the reaction, and if the diethylene glycol in the copolyester resin for a binder fiber is included at more than 5 wt. %, the glass transition temperature is significantly lowered such that heat resistance may be significantly reduced, and when forming fibers through spinning, the pack pressure may be increased and frequent trimming may be caused, thereby reducing spinnability.

In addition, the copolyester resin for a binder fiber according to the present invention may have 45 or less —COOH groups in the molecular structure, and preferably, 40 or less —COOH groups. If the copolyester resin for a binder fiber has more than 45 —COOH groups in the molecular structure, problems such as poor processability, high generation of acetaldehyde during the process and remarkably increased contents of impurities and acetaldehyde in the resin may occur.

In addition, the copolyester resin for a binder fiber according to the present invention may include 3 to 50 ppm of Ti element, and preferably. 5 to 40 ppm of Ti element. If the Ti element in the copolyester resin for a binder fiber is included at less than 3 ppm, as polymerization is possible with excellent reactivity even at low temperatures, it is not possible to simultaneously exhibit the effects that thermal decomposition is prevented and processability is excellent, the amount of acetaldehyde generated during the process is remarkably low, and it has remarkably low contents of impurities and acetaldehyde in resin, and at the same time, it is eco-friendly and has excellent heat resistance, high temperature stability and adhesive strength, and it is possible to express a desired color tone, and the adhesive strength may be reduced. In addition, if it is included at more than 50 ppm, problems where the color tone b value to be described below becomes excessive may occur.

In addition, the copolyester resin for a binder fiber according to the present invention may have a melting point or softening point of 100 to 180° C. and a glass transition temperature of 55 to 80° C., and preferably, a melting point or softening point of 120 to 180° C. and a glass transition temperature of 60 to 75° C. If the melting point or softening point of the copolyester resin for a binder fiber is less than 100° C. or the glass transition temperature is less than 55° C., heat resistance may be lowered, and problems where fibers and articles formed by including the copolyester resin for a binder fiber become excessively hard may occur. In addition, if the melting point or softening point of the copolyester resin for a binder fiber is more than 180° C. or the glass transition temperature is more than 80° C., low-temperature thermal bonding properties may be significantly reduced.

In addition, the copolyester resin for a binder fiber according to the present invention may further include a complementary colorant, and the complementary colorant may be a blue dye or a red dye. In this case, the complementary colorant may be included at 1 to 15 ppm, and preferably, 1 to 10 ppm.

Meanwhile, the copolyester resin for a binder fiber according to the present invention may have a color tone b value of 2 to 8.5, and preferably, a color tone b value of 2.5 to 8.

In addition, the copolyester resin for a binder fiber according to the present invention may have an intrinsic viscosity of 0.4 to 0.9 dL/g, and preferably, 0.5 to 0.8 dL/g, but the present invention is not limited thereto.

Meanwhile, the copolyester resin for a binder fiber according to the present invention is prepared through a method for preparing a copolyester resin for a binder fiber, including the steps of (1) forming an ester reactant by reacting an acid component including at least one of terephthalic acid and isophthalic acid and a diol component including a compound represented by Chemical Formula 1 above and ethylene glycol; and (2) preparing a copolyester resin for a binder fiber by polycondensation by adding a polycondensation catalyst including a titanium-based chelate compound to the ester reactant Meanwhile, in the description of the method for preparing the copolyester resin for a binder fiber, the same content as the description of the copolyester resin for a binder fiber described above will be omitted and described.

Step (1) is a step of forming an ester reactant, wherein the ester reactant may be formed by stirring the acid component and the diol component at 30 to 85 rpm for 140 to 250 minutes at a temperature of 195 to 265° C., and preferably, at 40 to 80 rpm for 150 to 240 minutes at a temperature of 200 to 260° C., but the present invention is not limited thereto.

Next, step (2) of preparing the copolyester resin for a binder fiber will be described.

In step (2), the polycondensation may be carried at a temperature of 285° C. or less, and preferably, at a temperature of 280° C. or less. If the polycondensation temperature is more than 285° C., thermal decomposition may occur, processability may be reduced, the amount of acetaldehyde generated in the process may be high, and the contents of impurities and acetaldehyde in the resin may be high.

Meanwhile, in step (2), the polycondensation catalyst including the titanium-based chelate compound may be added at 230 to 380 ppm, and preferably, at 250 to 350 ppm. Accordingly, the prepared copolyester resin for a binder fiber may include Ti element at 3 to 50 ppm, and preferably, 5 to 40 ppm. If the amount of the polycondensation catalyst added is less than 230 ppm, the adhesive strength of the binder fibers may be lowered, and if the amount of the catalyst is more than 380 ppm, problems where the desired color tone b value is not displayed may occur.

Further, in step (2), the amount of acetaldehyde generated by performing the polycondensation may be 1,650 ppb or less, and preferably, 1,630 ppb or less.

In addition, the present invention provides a binder fiber including the copolyester resin for a binder fiber according to the present invention.

In this case, the binder fiber may be a core-sheath-type composite fiber including a core part formed of a spinnable known resin and a sheath part formed of the copolyester resin for a binder fiber according to the present invention. In this case, each material may be compositely spun through a core-sheath-type spinneret to implement a core-sheath-type composite fiber including the core part and the sheath part.

The spinning can be used without limitation as long as it is a spinning condition commonly used in the art, and preferably, it may be performed at a spinning speed of 800 to 1,000 mpm at 250 to 300° C., and more preferably, at 850 to 950 mpm at 255 to 295° C., but the present invention is not limited thereto. In addition, the core part and the sheath part may be compositely spun at a weight ratio of 1:0.5 to 1.5, and preferably, 1:0.7 to 1.3, and the compositely spun fiber may be stretched by 2 to 4 times, and preferably, 2.5 to 3.5 times, but the present invention is not limited thereto.

Meanwhile, the prepared binder fiber may have a fiber length of 20 to 100 mm, and preferably, 25 to 80 mm, and a fineness of 1 to 10 De, and preferably. a fineness of 1.5 to 8 De, but the present invention is not limited thereto.

In addition, the present invention provides an automobile interior material and a sanitary material including the above-mentioned binder fiber.

In this case, since the above-mentioned binder fiber is the same as the description of the binder fiber applied to the known automobile interior material and sanitary material for the area and application method applied to the automobile interior material and sanitary material, this will not be separately described.

As polymerization is possible with excellent reactivity even at low temperatures, the copolyester resin for a binder fiber, method for preparing the same and binder fiber including the same according to the present invention can prevent thermal decomposition, processability is excellent, and the amount of acetaldehyde generated during the process is remarkably low, and at the same time, it is eco-friendly and has excellent heat resistance, high temperature stability and adhesive strength, and it has the effect of expressing a desired color tone.

Although the present invention will be described in more detail through the following examples, the following examples are not intended to limit the scope of the present invention, which should be interpreted to aid understanding of the present invention.

MODES OF THE INVENTION

Example 1

70 mol % of terephthalic acid and 30 mol % of isophthalic acid as an acid component, 37 mol % of compounds represented by Chemical Formulas 3 and 4 below as a diol component at a molar ratio of 1:0.11 and 63 mol % of ethylene glycol were introduced into an ester reactor, and the reaction was performed at a temperature of 250° C. and a pressure of 1,140 Torr to obtain an ester reactant. In this case, the acid component and the diol component were added at a molar ratio of 1:1.2.

The obtained ester reactant was transferred to a polycondensation reactor, a titanium-based chelate compound represented by Chemical Formula 2 below was added at 300 ppm as the polycondensation catalyst, and triethyl phosphate was added at 20 ppm based on the P content as a heat stabilizer, and the polycondensation reaction was performed by raising the temperature to 280° C. while reducing the pressure to a final pressure of 0.5 Torr to prepare a copolyester resin for a binder fiber.

[Chemical Formula 2]

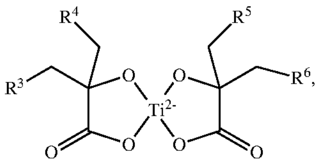

[Chemical Formula 3]

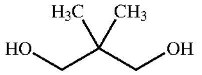

[Chemical Formula 4]

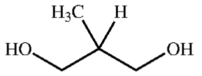

Examples 2 to 15

These were prepared in the same manner as in Example 1, except that the amount of the polycondensation catalyst added, the polycondensation temperature, the molar ratio of the compound represented by Chemical Formula 3 and the compound represented by Chemical Formula 4 and the mol % of the compound represented by Chemical Formula 1 were changed to prepare copolyester resins for a binder fiber as shown in Tables 1 to 3.

Comparative Example 1

It was prepared in the same manner as in Example 1, except that the added polycondensation catalyst was changed to antimony trioxide to prepare a copolyester resin for a binder fiber as shown in Table 4.

Comparative Examples 2 to 5

These were prepared in the same manner as in Comparative Example 1, except that the amount of polycondensation catalyst added and the polycondensation temperature were changed to prepare copolyester resins for a binder fiber as shown in Table 4.

Experimental Example 1

The following physical properties of the copolyester resins for a binder fiber according to the examples and comparative examples were evaluated, and the results are shown in Tables 1 to 4 below.

1. Measurement of Melting Point and Glass Transition Temperature

The glass transition temperature and melting point of the copolyester resins for a binder fiber were measured by using a differential calorimeter under the condition of a heating rate of 20° C./min.

2. Measurement of Intrinsic Viscosity

The copolyester resins for a binder fiber were melted in an ortho-chlorophenol solvent at a concentration of 2.0 g/25 mL at 110° C. for 30 minutes, and then, intrinsic viscosity was measured by maintaining a constant temperature at 25° C. for 30 minutes by using an automatic viscosity measuring device connected to a CANON viscometer.

3. Measurement of carboxyl Group (—COOH) Content in Molecular Structure

The carboxyl group (—COOH) content in the molecular structure was measured according to the method of Phol. 0.13 g of copolyester resin powder for a binder fiber, which was pulverized to a size of 20 mesh, was precisely weighed into a test tube, and 5 mL of benzyl alcohol was added thereto, and the mixture was heated and dissolved at 210° C. for 135 seconds while stirring with a micro stirrer. After dissolving, the test tube was immersed in water at 25° C. for 6 seconds to rapidly cool, and the contents were poured into a 50 mL beaker containing 10 mL of chloroform, and then, 5 mL of benzyl alcohol was added to the test tube and stirred for 60 seconds to rinse the remaining solution completely, and then, it was immediately applied to a beaker and used as the titration solution. The carboxyl group content was neutralized with phenol red (0.1% benzyl alcohol solution) as an indicator and 0.1N sodium hydroxide benzyl alcohol solution was neutralized by using a mycrosyringe (volume: 100 μL), and the titration value was corrected according to the blank test result for the titration reagent and was calculated according to Calculation Formula 1 below.

[Calculation Formula 1]

$$\text{Carbonyl group content } (eq./106\text{ g copolyester}) = [\text{Volume of titrant } (\mu L) - \text{Blank test result } (\mu L)] \times 0.1 \times f/\text{Weight of copolyester sample.}$$

Herein, f is the concentration coefficient of 0.1 N sodium hydroxide benzyl alcohol solution.

4. Measurement of Amount of acetaldehyde Generated During Polycondensation

Regarding the amount of acetaldehyde generated during the polycondensation of the copolyester resin for a binder fiber, the amount of acetaldehyde generated during polycondensation was measured through the MS 300-55 method (SOP-No. 79: 2020-02 (microwave-assisted digestion)).

5. Measurement of Amount of Ti Element Detected in Resin

For the copolyester resins for a binder fiber, the detected amount of Ti element in the resin was measured through the ICP analysis method (DIN EN ISO 17294-2: 2017-01 (ICP-MS)).

Preparation Example 1: Preparation of Binder Fiber

In order to prepare a binder fiber, which is a core-sheath type composite fiber having the copolyester resin for a binder fiber prepared according to Example 1 as a sheath part and polyethylene terephthalate (PET) as a core part, composite spinning was performed at a spinning speed of 900 mpm at a spinning temperature of 275° C. through a core-sheath type spinneret such that the weight ratio of the core part and the sheath part was 5:5, and it was stretched by 3 times to prepare a binder fiber with a fiber length of 51 mm and a fineness of 4 De.

Preparation Examples 2 to 15 and Comparative Preparation Examples 1 to 5

These were prepared in the same manner as in Preparation Example 1, except that the copolyester resin for a binder prepared according to Example 1 was changed with the copolyester resins for a binder fiber prepared according to Examples 2 to 15 and Comparative Examples 1 to 5, respectively, to prepare binder fibers.

Experimental Example 2

The following physical properties of the binder fibers prepared according to the preparation examples and comparative preparation examples were measured, and the results are shown in Tables 1 to 4 below.

1. Measurement of Adhesive Strength

After the prepared binder fibers and polyethylene terephthalate (PET) short fibers (fiber length 51 mm, fineness 4.0 de) were mixed and opened at a ratio of 5:5, these were subjected to heat treatment under temperature conditions of 120° C., 140° C. and 160° C. to implement hot-melt non-woven fabrics having a basis weight of 35 $g/m^2$, and the adhesive strength was measured by using a universal testing machine (UTM) according to the KS M ISO 36 standard by implementing a specimen having a width, length and thickness of 100 mm×20 mm×10 mm, respectively. Meanwhile, if the shape was deformed due to excessive shrinkage during heat treatment, the adhesive strength was not evaluated, and it was evaluated as 'shape deformation.'

2. Evaluation of Spinning Workability

For the prepared binder fibers, the number of occurrences of drips (meaning a lump formed by partial fusion of fiber strands passing through a spinneret or irregular fusion of strands after trimming) was counted through a drip detector, and the number of drips occurring in the remaining preparation examples and comparative preparation examples was expressed as a relative ratio based on the number of drips occurring in the preparation of the binder fiber according to Preparation Example 1 as 100.

3. Evaluation of Spinneret Wiping Cycle

By including wiping work, which is a cleaning work on the spinneret surface to improve spinning operability and prevent the contamination of foreign substances during spinning operation, which is performed regularly for the prepared binder fibers once/day, the case where additional wiping work occurred was counted in a unit per day to count the total number of wiping per day.

4. Evaluation of Amount of acetaldehyde Generated

The prepared binder fiber was placed into a 3 L Tedlar bag, filled with nitrogen by ⅔ and placed in the Tedlar bag in an oven with an internal temperature of 65° C. and heated for 2 hours, and it was left at room temperature for 30 minutes, and then, nitrogen was additionally filled such that the Tedlar bag was completely filled with nitrogen. Thereafter, the amount of acetaldehyde generated was measured by the Gastech detector tube method.

5. Evaluation of Color Tone B Value

After hand carding each binder fiber in the Color Difference Meter (ZE-6000, NIPPON DENSHOKU Co., Ltd.), which is a facility that can measure the color of a solid sample with respect to the prepared binder fiber, color tone b value was measured through the analysis method.

TABLE 1

| Classification | | Example 1 | Example 2 | Example 3 | Example 4 | Example 5 |
|---|---|---|---|---|---|---|
| Diol component | Molar ratio of Chemical Formula 3 and Chemical Formula 4 | 1:0.11 | 1:0.11 | 1:0.11 | 1:0.11 | 1:0.11 |
| | Total content of Chemical Formula 3 and Chemical Formula 4 (mol %) | 37 | 37 | 37 | 37 | 37 |

TABLE 1-continued

| Classification | | Example 1 | Example 2 | Example 3 | Example 4 | Example 5 |
|---|---|---|---|---|---|---|
| Polycondensation catalyst | Type | Titanium-based | Titanium-based | Titanium-based | Titanium-based | Titanium-based |
| | Added amount (ppm) | 300 | 200 | 250 | 350 | 400 |
| Polycondensation | Temperature (° C.) | 280 | 280 | 280 | 280 | 280 |
| Copolyester resin | Melting point (° C.) | 137 | 149 | 141 | 137 | 133 |
| | Glass transition temperature (° C.) | 69 | 77 | 74 | 62 | 56 |
| | Intrinsic viscosity (dl/g) | 0.64 | 0.58 | 0.62 | 0.64 | 0.64 |
| | —COOH (EA) | 33 | 34 | 33 | 35 | 39 |
| | Amount of acetaldehyde generated (ppb) | 1340 | 2519 | 1402 | 1450 | 3002 |
| | Amount of Ti detected (ppm) | 21 | 2 | 6 | 38 | 51 |
| Binder fiber | Adhesive strength (N) | 140 | 110 | 134 | 141 | 145 |
| | Spinning workability | 100 | 90 | 90 | 120 | 220 |
| | Wiping cycle (times/day) | 1 | 1 | 1 | 1 | 2 |
| | Amount of acetaldehyde generated (ppb) | 350 | 370 | 361 | 354 | 360 |
| | B value | 4.2 | 4.3 | 4.2 | 7.2 | 8.9 |

TABLE 2

| Classification | | Example 6 | Example 7 | Example 8 | Example 9 | Example 10 |
|---|---|---|---|---|---|---|
| Diol component | Molar ratio of Chemical Formula 3 and Chemical Formula 4 | 1:0.11 | 1:0.11 | 1:0.01 | 1:0.025 | 1:0.937 |
| | Total content of Chemical Formula 3 and Chemical Formula 4 (mol %) | 37 | 37 | 37 | 37 | 37 |
| Polycondensation catalyst | Type | Titanium-based | Titanium-based | Titanium-based | Titanium-based | Titanium-based |
| | Added amount (ppm) | 300 | 300 | 300 | 300 | 300 |
| Polycondensation | Temperature (° C.) | 270 | 290 | 280 | 280 | 280 |
| Copolyester resin | Melting point (° C.) | 142 | 138 | 97 | 137 | 139 |
| | Glass transition temperature (° C.) | 73 | 56 | 47 | 60 | 75 |

TABLE 2-continued

| Classification | | Example 6 | Example 7 | Example 8 | Example 9 | Example 10 |
|---|---|---|---|---|---|---|
| | Intrinsic viscosity (dl/g) | 0.61 | 0.64 | 0.65 | 0.64 | 0.64 |
| | —COOH (EA) | 40 | 49 | 35 | 34 | 34 |
| | Amount of acetaldehyde generated (ppb) | 1302 | 2666 | 1507 | 1468 | 1520 |
| | Amount of Ti detected (ppm) | 21 | 21 | 21 | 21 | 21 |
| Binder fiber | Adhesive strength (N) | 135 | 138 | 141 | 140 | 138 |
| | Spinning workability | 140 | 760 | 100 | 100 | 100 |
| | Wiping cycle (times/day) | 2 | 6 | 1 | 1 | 1 |
| | Amount of acetaldehyde generated (ppb) | 350 | 600 | 360 | 350 | 350 |
| | B value | 4.5 | 6.2 | 4.3 | 4.2 | 4.2 |

TABLE 3

| Classification | | Example 11 | Example 12 | Example 13 | Example 14 | Example 15 |
|---|---|---|---|---|---|---|
| Diol component | Molar ratio of Chemical Formula 3 and Chemical Formula 4 | 1:1.2 | 1:0.11 | 1:0.11 | 1:0.11 | 1:0.11 |
| | Total content of Chemical Formula 3 and Chemical Formula 4 (mol %) | 37 | 20 | 30 | 45 | 55 |
| Polycondensation catalyst | Type | Titanium-based | Titanium-based | Titanium-based | Titanium-based | Titanium-based |
| | Added amount (ppm) | 300 | 300 | 300 | 300 | 300 |
| Polycondensation | Temperature (° C.) | 280 | 280 | 280 | 280 | 280 |
| Copolyester resin | Melting point (° C.) | 141 | 186 | 148 | 133 | 122 |
| | Glass transition temperature (° C.) | 86 | 88 | 70 | 71 | 87 |
| | Intrinsic viscosity (dl/g) | 0.61 | 0.62 | 0.63 | 0.63 | 0.63 |
| | —COOH (EA) | 34 | 34 | 33 | 33 | 34 |
| | Amount of acetaldehyde generated (ppb) | 1555 | 1689 | 1625 | 1324 | 1280 |
| | Amount of Ti detected (ppm) | 21 | 21 | 21 | 21 | 21 |

TABLE 3-continued

| Classification | | Example 11 | Example 12 | Example 13 | Example 14 | Example 15 |
|---|---|---|---|---|---|---|
| Binder fiber | Adhesive strength (N) | 135 | 106 | 137 | 139 | 108 |
| | Spinning workability | 270 | 180 | 100 | 110 | 740 |
| | Wiping cycle (times/day) | 3 | 2 | 1 | 1 | 5 |
| | Amount of acetaldehyde generated (ppb) | 350 | 370 | 350 | 350 | 360 |
| | B value | 4.1 | 4.4 | 4.2 | 4.2 | 4.4 |

TABLE 4

| Classification | | Comparative Example 1 | Comparative Example 2 | Comparative Example 3 | Comparative Example 4 | Comparative Example 5 |
|---|---|---|---|---|---|---|
| Diol component | Molar ratio of Chemical Formula 3 and Chemical Formula 4 | 1:0.11 | 1:0.11 | 1:0.11 | 1:0.11 | 1:0.11 |
| | Total content of Chemical Formula 3 and Chemical (mol %) | 37 | 37 | 37 | 37 | 37 |
| Polycondensation catalyst | Type | Antimony-based | Antimony-based | Antimony-based | Antimony-based | Antimony-based |
| | Added amount (ppm) | 300 | 200 | 400 | 300 | 300 |
| Polycondensation | Temperature (° C.) | 290 | 290 | 290 | 280 | 300 |
| Copolyester resin | Melting point (° C.) | 138 | 142 | 143 | 139 | 137 |
| | Glass transition temperature (° C.) | 69 | 68 | 66 | 68 | 69 |
| | Intrinsic viscosity (dl/g) | 0.59 | 0.59 | 0.64 | 0.56 | 0.68 |
| | —COOH (EA) | 65 | 60 | 63 | 92 | 80 |
| | Amount of acetaldehyde generated (ppb) | 2550 | 2491 | 2486 | 1457 | 2722 |
| | Amount of Ti detected (ppm) | 24 | 24 | 24 | 24 | 24 |
| Binder fiber | Adhesive strength (N) | 110 | 93 | 140 | 138 | 140 |
| | Spinning workability | 770 | 750 | 620 | 1120 | 910 |
| | Wiping cycle (times/day) | 6 | 6 | 5 | 9 | 7 |
| | Amount of acetaldehyde generated (ppb) | 650 | 670 | 620 | 550 | 860 |
| | B value | 5.8 | 5.9 | 5.5 | 4.6 | 9.1 |

As can be seen from Tables 1 to 4, it was confirmed that Examples 1, 3, 4, 6, 9, 10, 13 and 14, which satisfied all of the amount of the polycondensation catalyst added, the polycondensation temperature, the molar ratio between the compound represented by Chemical Formula 3 and the compound represented by Chemical Formula 4, the mol % of the compound represented by Chemical Formula 1 and the type of polycondensation catalyst according to the present invention, exhibited an appropriate melting point, glass transition temperature and intrinsic viscosity and had less —COOH groups and a remarkably low amount of acetaldehyde generated during the process, and at the same time, the adhesive strength and spinning workability were excellent, the number of wiping was low, the amount of acetaldehyde generated was low, and an appropriate color tune b value was shown, compared to Examples 2, 5, 7, 8, 11, 12, 15 and Comparative Examples 1 to 5 which did not satisfy any one of the above.

The invention claimed is:

1. A copolyester resin for a binder fiber, wherein the copolyester resin is formed by polycondensing an ester reactant under a polycondensation catalyst comprising a titanium-based chelate compound, wherein the ester reactant is an ester reaction product of:

an acid component comprising terephthalic acid and isophthalic acid; and a diol component comprising 25 to 50 mol % of a compound represented by Chemical Formula 3 and a compound represented by Chemical Formula 4 and 50 to 75 mol % of ethylene glycol:

[Chemical Formula 3]

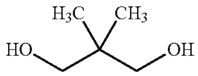

-continued

[Chemical Formula 4]

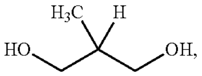

wherein the diol comprises a compound represented by Chemical Formula 3 and a compound represented by Chemical Formula 4 in a molar ratio of 1:0.02 to 1, and wherein the copolyester resin for a binder fiber has 45 or less —COOH groups in the molecular structure and comprises 3 to 50 ppm of Ti element.

2. The copolyester resin of claim 1, wherein the copolyester resin for a binder fiber comprises diethylene glycol at 5 wt. % or less.

3. The copolyester resin of claim 1, wherein the melting point or softening point is 100 to 180° C., and the glass transition temperature is 55 to 80° C.

4. The copolyester resin of claim 1, wherein the ester reactant is formed by reacting the acid component and the diol component at a molar ratio of 1:0.8 to 1:6.

5. The copolyester resin of claim 1, wherein the acid component comprises 70-99 mol % of terephthalic acid and 1 to 30 mol % of isophthalic acid.

6. A binder fiber, comprising the copolyester resin for a binder fiber according to claim 1.

7. An automobile interior material, comprising the binder fiber according to claim 6.

8. A sanitary material, comprising the binder fiber according to claim 6.

* * * * *